United States Patent
Jung et al.

(10) Patent No.: US 11,024,328 B2
(45) Date of Patent: Jun. 1, 2021

(54) GENERATING A SYNOPSIS OF A MEETING

(71) Applicant: MICROSOFT TECHNOLOGY LICENSING, LLC, Redmond, WA (US)

(72) Inventors: Christopher Andrews Jung, Seattle, WA (US); Benjamin David Smith, Woodinville, WA (US); Erez Kikin Gil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/393,944

(22) Filed: Apr. 24, 2019

(65) Prior Publication Data

US 2020/0342895 A1      Oct. 29, 2020

(51) Int. Cl.
*G10L 25/63*       (2013.01)
*G06K 9/00*       (2006.01)
*G10L 15/26*       (2006.01)

(52) U.S. Cl.
CPC .......... *G10L 25/63* (2013.01); *G06K 9/00718* (2013.01); *G10L 15/26* (2013.01)

(58) Field of Classification Search
USPC .................................................... 704/1–504
See application file for complete search history.

(56) References Cited

U.S. PATENT DOCUMENTS

| | | | |
|---|---|---|---|
| 8,670,018 B2* | 3/2014 | Cunnington | G06Q 10/10 348/14.08 |
| 10,218,954 B2* | 2/2019 | Lakhani | H04N 9/8715 |
| 10,573,312 B1* | 2/2020 | Thomson | G10L 15/30 |
| 2005/0209848 A1* | 9/2005 | Ishii | H04L 12/1831 704/231 |
| 2011/0295392 A1* | 12/2011 | Cunnington | H04N 7/15 700/90 |

(Continued)

OTHER PUBLICATIONS

"International Search Report and Written Opinion Issued in PCT Application No. PCT/US20/025622", dated Sep. 9, 2020, 14 Pages.

(Continued)

*Primary Examiner* — Marcus T Riley
(74) *Attorney, Agent, or Firm* — NovoTechIP International PLLC

(57) ABSTRACT

The systems and techniques disclosed here feature a device including an audio analyzer connected to microphone(s) monitoring a conversation between one or more individuals. The audio analyzer can identify auditory expressions from audio captured by the microphone, where the auditory expressions can include linguistic expressions and nonlinguistic expressions. The audio analyzer can analyze the linguistic expressions to identify a topic and a time period when the topic was discussed. A video analyzer can be connected to camera(s) monitoring the conversation. The video analyzer can identify non-auditory expressions by the individuals from video captured by the camera. A sentiment analyzer can analyze auditory expressions during the time period when the topic was discussed and non-auditory expressions during the time period when the topic was discussed to determine sentiments to the topic. A processor can analyze the determined sentiments to the topic to determine a group sentiment to the topic.

20 Claims, 5 Drawing Sheets

(56) References Cited

U.S. PATENT DOCUMENTS

| | | | | |
|---|---|---|---|---|
| 2014/0253672 | A1* | 9/2014 | Bank | H04L 12/1827 |
| | | | | 348/14.08 |
| 2014/0282089 | A1* | 9/2014 | West | G06F 16/683 |
| | | | | 715/753 |
| 2015/0178915 | A1* | 6/2015 | Chatterjee | G06F 16/58 |
| | | | | 382/128 |
| 2016/0358632 | A1* | 12/2016 | Lakhani | H04N 9/8715 |
| 2018/0005037 | A1* | 1/2018 | Smith, IV | G10L 15/26 |
| 2018/0133900 | A1* | 5/2018 | Breazeal | B25J 19/026 |
| 2018/0365657 | A1* | 12/2018 | Kitada | H04N 7/15 |
| 2019/0340437 | A1* | 11/2019 | Smith, IV | G06K 9/6256 |
| 2020/0342895 | A1* | 10/2020 | Jung | G10L 15/26 |

OTHER PUBLICATIONS

Poria, et al., "Fusing Audio, Visual and Textual Cues for Sentiment Analysis from Multimodal Content", In Journal of Neurocomputing, vol.—174, Aug. 17, 2015, pp. 50-59.

* cited by examiner

Participants' sentiment ✕

Meeting notes
Contoso NextGen Camera Product Planning
3/13/2018, 3PM

35% negative responses      56% positive responses        1 MVP followup
                                                                  Presented media

Quick summary from the EBS session today:

Concerned (-1)
10:05 We met with the OECD executive director (Omar's boss) and the woman on her team who was introduced to us as a consultant to Omar back in December - she is now IT director for digital modernization Ambivalent (-1)
10:12 Executive director said her first goal for modernization is to get people to stop using email and collaborate in modern ways. They are preparing to move to SPO - but Microsoft is still working on allaying their security concerns...

Having a side discussion (0)
10:24 These ladies reminded me a bit of Jess and Vanessa at Grey - not as modern, certainly - but they actively (especially the exec director who is in place now about a year) want to modernize and are taking steps to do so...

Annoyed (-3)
10:37 Didn't do the user journey. They wanted to see the roadmap more pressingly than future concepts - they wanted to walk away with something they could action in the near-term...

Concerned (-1)
10:43 We ran out of time because they were behind/we started late - so we didn't finish; didn't get to Read/Write section and they agree that's super important to them...

FIG. 3

GENERATING A SYNOPSIS OF A MEETING

BACKGROUND

The present application is in the field of devices, methods, and computer program products for generating a synopsis of a meeting.

Transcription services use speech recognition in order to convert human speech (live or recorded) into corresponding text. A written or electronic text document produced by a transcription service can be reviewed to identify what was said during a meeting or presentation. However, the content of the produced document is limited to what was said during the meeting by people that spoke during the meeting. Conventional transcription services are unable to effectively capture and represent the sentiments of individuals participating in the meeting or the general sentiment of a group of individuals. Moreover, conventional transcription services do not effectively generate a synopsis of a meeting based on analysis or post-processing of input captured in the meeting to determine the significance of what was said by individuals participating in the meeting and/or of physical actions performed by the individuals. Hence there is a need for a system and method of analyzing expressions of individuals in a meeting to determine a general group sentiment and/or consensus for the meeting.

SUMMARY

In one general aspect, the systems and techniques disclosed here feature a device for determining an overall sentiment to a conversation. The device can include an audio analyzer connected to one or more microphones monitoring a conversation between one or more individuals. In at least one implementation, the audio analyzer identifies auditory expressions from audio captured by the microphone, where the auditory expressions include linguistic expressions and nonlinguistic expressions. The audio analyzer can analyze the linguistic expressions to identify a topic and a time period when the topic was discussed. A video analyzer can be connected to one or more cameras monitoring the conversation. The video analyzer can identify non-auditory expressions by the individuals from video captured by the camera. In at least one implementation, a sentiment analyzer is connected to the audio analyzer and the video analyzer, where the sentiment analyzer analyzes auditory expressions during the time period when the topic was discussed and non-auditory expressions during the time period when the topic was discussed to determine sentiments to the topic. A processor can be connected to the sentiment analyzer. The processor can analyze the determined sentiments to the topic to determine a group sentiment to the topic and analyze group sentiments to multiple topics to determine an overall sentiment to the conversation.

A method, in accordance with a second aspect of this disclosure, includes a first step of identifying auditory expressions from audio captured by one or more microphones monitoring a conversation between two or more individuals. The auditory expressions can include linguistic expressions and nonlinguistic expressions. A second step includes analyzing via a voice analyzer the linguistic expressions to identify a topic and a time period when the topic was discussed. In a third step, non-auditory expressions by the individuals are identified from video captured by one or more cameras monitoring the conversation. A fourth step includes analyzing via a sentiment analyzer auditory expressions during the time period when the topic was discussed and/or non-auditory expressions during the time period when the topic was discussed to determine sentiments to the topic. In a fifth step, a processor analyzes the determined sentiments to the topic to determine a group sentiment to the topic.

A computer program product for determining a group sentiment, in accord with a third aspect of this disclosure, includes a computer readable storage medium having encoded thereon first program instructions executable by a processor to cause the processor to identify auditory expressions from audio captured by one or more microphones monitoring a conversation between two or more individuals. The auditory expressions can include linguistic expressions and nonlinguistic expressions. The computer program product further includes second program instructions executable by the processor to cause the processor to analyze the linguistic expressions to identify a topic and a time period when the topic was discussed, and third program instructions executable by the processor to cause the processor to identify non-auditory expressions by the individuals from video captured by one or more cameras monitoring the conversation. Fourth program instructions are provided that are executable by the processor to cause the processor to analyze at least one of auditory expressions during the time period when the topic was discussed and non-auditory expressions during the time period when the topic was discussed to determine sentiments to the topic. The computer program product further includes fifth program instructions executable by the processor to cause the processor to analyze the determined sentiments to the topic to determine a group sentiment to the topic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 is a diagram illustrating an interface of a device;

DETAILED DESCRIPTION

Figure 1:
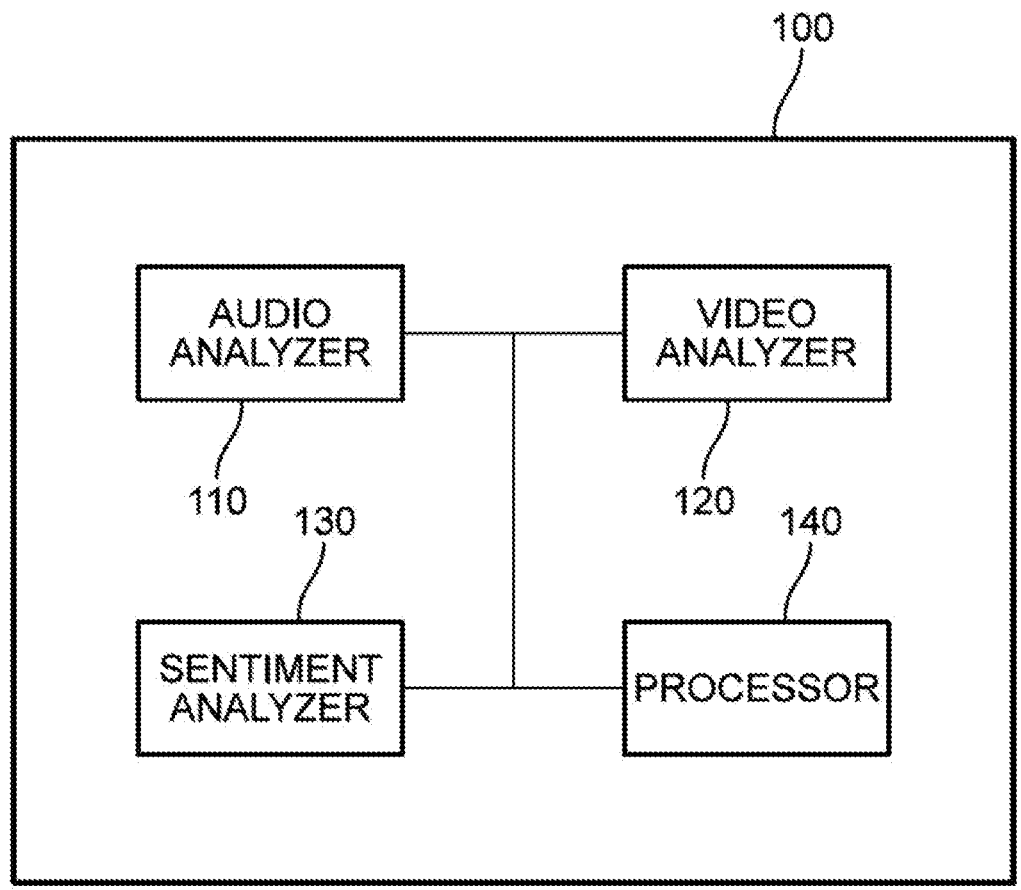
FIG. 1 is a conceptual diagram illustrating a device for determining an overall sentiment to a conversation.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A system is provided that can analyze nonlinguistic expressions and non-auditory expressions (e.g., head nods, raised hands, head shakes, etc.) captured by a camera to determine a general group sentiment and/or consensus for a meeting. In one example, the system analyzes the course of conversation and/or physical user movement (e.g., what was said, who said it, strength of voice, number of interruptions, raised hands, facial expressions, etc.) to determine a critical or controversial topic that needs to be revisited. In another example, the system analyzes the course of conversation and/or physical user movement to determine that the group generally reached a consensus with regard to a topic (e.g., most people agreed to pursue one proposed option over other proposed options). In a further example, the system analyzes the course of conversation and/or physical user movement to determine whether a proposed option during a meeting was met with positive or negative reaction from the group.

In further implementations, the system generates follow-up tasks (i.e., indicating critical tasks based on reactions during the meeting) and/or flag/mark a representation of a meeting (e.g., a calendar object) based on a sentiment analysis (e.g., a red flagged meeting may indicate that group consensus with regard to a topic was not reached and that another meeting needs to be scheduled). The system can then generate notifications/reminders to a user (e.g., a team leader) to schedule another meeting to further discuss the topic for which no group consensus was reached.

In further implementations, a synopsis of the meeting generated by the system includes an overall summary of effectiveness (e.g., consensus reached, positive/negative reactions, etc.). The summaries for all of a user's meetings over a period of time (e.g., a month) can be accessed via a dashboard with indications of consensus and/or sentiment for each meeting. In this way, a user can quickly revisit meetings to determine which topics spurred a positive team discussion and reached a group consensus and/or which topics spurred a negative or controversial team discussion and did not reach a group consensus.

The system can also infer a user's intent that is associated with a detected expression. An explicit expression that represents user intent can include direct verbal and visual cues that are clearly directed to a meeting context (e.g., a discussed topic). For example, after a meeting participant articulates an idea, other participants might express a negative reaction (e.g., saying negative sentiment utterances, people booing, waving hands in a negative way, cheering and hand clapping, etc.). An implicit expression that represents user intent can include subtle hints in reaction to a meeting context. For example, after a participant articulates an idea there may be a lack of reaction, an exchange of funny looks between participants, side conversations occurring during a presentation, a number of distracted participants that are working on other tasks, participants using their phone, etc.

In at least one implementation, the system reflects the group sentiment and group consensus in a synopsis of the meeting and/or a meeting transcript. Follow-up task(s) can be generated based on the determined sentiment and consensus with regard to a particular topic or a particular issue (e.g., set up another meeting). Determined sentiments and a consensus with regard to a particular topic or a particular issue can be represented in a dashboard. In one example, a user can review a week's worth of meetings and quickly preview the outcome of the discussed topics or issues. In at least one implementation, the system can understand a participant's intent behind certain utterances and expressions. Expression can be explicit (e.g., a spoken comment, a clear negative or positive gesture) or implicit (e.g., meeting participants staring out the window or looking at their phones may represent boredom with respect to a particular topic).

FIG. 1 is a conceptual diagram illustrating a device 100 for determining an overall sentiment to a conversation. The device 100 can include an audio analyzer 110, a video analyzer 120, a sentiment analyzer 130, and a processor 140. Although FIG. 1 shows the audio analyzer 110, the video analyzer 120, the sentiment analyzer 130, and the processor 140 as separate components, in at least one implementation, the audio analyzer 110, the video analyzer 120, the sentiment analyzer 130, and the processor 140 could reside on a single component (e.g., a processor).

As used herein, the term "audio analyzer" includes a computer hardware component (e.g., a processor) connected to one or more microphones monitoring a conversation between two or more individuals (also referred to herein as a "meeting" or "presentation"). The microphone can be on a laptop computer, tablet computer, cellular telephone; or the microphone can be a separate device connected to a computer or other recording device. As used herein, the term "connected" can include operationally connected, logically connected, in communication with, physically or wirelessly connected, engaged, coupled, contacts, linked, affixed, and attached.

The audio analyzer 110 can identify auditory expressions from audio captured by the microphone. The auditory expressions can include linguistic expressions (e.g., statements and questions with words) and nonlinguistic expressions (e.g., sighs, groans, chuckles, yawns, laughs, yells, whistles, etc.). The audio analyzer 110 can analyze the linguistic expressions to identify a topic discussed during the conversation (e.g., quarterly earnings) and a time period when the topic was discussed. The identified time period can be identified in seconds, minutes, or hours from the beginning of the conversation (e.g., 1:40:01-1:40:12) and/or via the time of day (e.g., 10:11:56 EDT-10:26:03 EDT). In at least one implementation, the identified time period can be a 1 second time stamp (e.g., 22:50, or 22 minutes and 50 seconds, from the beginning of the conversation). In addition to topics, the audio analyzer 110 can also identify time periods when the auditory expressions were identified (e.g., a sigh at 15:13; cheering from 1:22:15 EDT to 1:22:21 EDT).

In at least one implementation, the audio analyzer 110 identifies that a topic is being discussed when there is a threshold number (e.g., 1) of auditory and/or non-auditory expressions identified within a predetermined time period (e.g., 10 seconds). For example, the audio analyzer 110 identifies that a topic was discussed between 4:28:03 PST and 4:28:03 PST because a total of 5 or more auditory and non-auditory expressions were identified during this time period. In one implementation to identify that the topic was discussed, the audio analyzer 110 may identify text from the meeting transcript that were transcribed from words that were spoken between 4:28:03 PST and 4:28:13 PST and may identify the topic based on the text from the meeting transcript. For example, the following text can be identified from the meeting transcript and identified as the topic: "the hiring committee had a lengthy discussion during last week's board meeting. It was decided that we will be hiring 2 new staff members next month."

As used herein, the term "video analyzer" includes a computer hardware component (e.g., a processor) connected to one or more cameras monitoring the conversation. The camera can be on a laptop computer, tablet computer, cellular telephone; or the camera can be a separate device connected to a computer or other recording device. The video analyzer 120 identifies non-auditory expressions by the individuals from video captured by the camera and time periods when the non-auditory expressions were identified. For example, the video analyzer 120 identifies a frown at 15:13, or a smile from 1:22:15 EDT to 1:22:21 EDT. Implementations of the present disclosure, and in particular other techniques for identifying non-auditory expressions, can make use of any of the features, systems, components, devices, and methods described in U.S. Patent Publication Number 2015/0178915 to Chatterjee et al., published Jun. 25, 2015 and titled "Tagging Images With Emotional State Information", the disclosure of which is herein incorporated by reference in its entirety.

As used herein, the term "sentiment analyzer" includes a computer hardware component (e.g., a processor) connected to the audio analyzer 110 and/or the video analyzer 120. The sentiment analyzer 130 can analyze auditory and/or non-auditory expressions to determine sentiments to the topic. In at least one implementation, the sentiment analyzer 130 also analyzes auditory and non-auditory expressions at predetermined time intervals (e.g., 5 seconds) before and after the time period when the topic was discussed. In keeping with the previous example, the audio analyzer 110 identifies that a topic was discussed between 4:28:03 PST and 4:28:03 PST. Thus, in at least one implementation, the sentiment analyzer 130 also analyzes auditory and non-auditory expressions between 4:27:58 PST and 4:28:08 PST.

In at least one implementation, the processor 140 analyzes the determined sentiments to a particular topic to determine a group sentiment to the topic. When there is more than one sentiment per topic, the processor 140 can generate a numeric score for each of the determined sentiments (e.g., −5 to +5), where a numeric score above zero indicates a positive sentiment and a numeric score below zero indicates a negative sentiment (also referred to herein as a "second sentiment"). The processor 140 can generate a higher numeric score to indicate a greater positive sentiment, and a lower numeric score to indicate a greater negative sentiment. For example, if an individual yells, cheers and claps her hands, then a numeric score of +5 is generated. If an individual boos and frowns a numeric score of −5 is generated. In another example, a first individual smiles and a second individual frowns. The processor 140 can generate a numeric score of +1 for the first individual and a numeric score of −1 for the second individual. The processor 140 can calculate a sum of the numeric scores for each topic. A higher sum can indicate a greater positive group sentiment; and, a lower sum below zero can indicate a greater negative group sentiment.

The individuals participating in the conversation can include VIPs (e.g., managers, clients, owners) and non-VIPs. The processor 140 can generate a numeric score for each determined sentiment that was expressed by a VIP, where a numeric score above zero indicates a positive sentiment, and wherein a numeric score below zero indicates a negative sentiment. The processor 140 can calculate a sum of the numeric scores, where the sum only includes numeric scores for sentiments expressed by VIPs. A sum above zero can indicate a positive VIP sentiment (also referred to herein as a "first group sentiment"); and, a sum below zero can indicate a negative VIP sentiment (also referred to herein as a "second first group sentiment").

In another implementation, the processor 140 generates a first numeric score for each of the determined sentiments that were expressed by a first group and a second numeric score for each of the determined sentiments that were expressed by a second group. In one specific example, the first group may be referred to as a VIP group or a group that has been designated as important to the user and the second group may be referred to as a non-VIP group, which can include individuals who lack VIP status. The processor 140 can generate a third numeric score by multiplying each of the first numeric scores by a VIP factor (e.g., 2). The second numeric scores and the third numeric scores can be summed by the processor 140. In the example where the VIP factor (also referred to herein as a "first group factor") of 2 is utilized, the VIP sentiments are given twice as much weight as non-VIP sentiment. A sum above zero can indicate a positive group sentiment; and, a sum below zero can indicate a negative group sentiment.

In at least one implementation, the processor 140 analyzes group sentiments to multiple topics to determine an overall sentiment to the conversation. The processor 140 can calculate a sum of all of the group topic numeric scores to generate an overall meeting score. For example, a meeting has a group topic score of +9 for the topic "telecommuting Fridays", a group topic score of −7 for "hiring additional sales associate", a group topic score of −22 for "changed date for product launch", and a group topic score of −11 for "server upgrade". In this example, the overall sentiment to the conversation is negative (e.g., −31).

In another implementation, the processor 140 identifies the total number of sentiments, the number of negative sentiments, and the number of positive sentiments, and calculates the percentage of sentiments that were negative, and the percentage of sentiments that were positive. For example, if there were 200 sentiments identified in a meeting, 70 sentiments were negative, 112 sentiments were positive, and 18 sentiments were neither negative nor positive (or undetermined), then the processor 140 determines that the overall sentiment to the conversation was 35% negative and 56% positive. The overall sentiment can be shown towards the top of the interface, as illustrated in FIG. 3.

The processor 140 can also generates a follow-up meeting suggestion and/or a follow-up task list when a group sentiment to a topic is determined to be above or below a threshold. For example, if the topic "hiring additional staff" has a numeric score above a threshold (e.g., 80%), then a follow-up meeting is generated or suggested to discuss the possibility of increased hiring. In another example, if the topic "move weekly meeting from Wednesday to Monday" has a numeric score below a threshold (e.g., numeric score of −10), then a follow-up task is generated to revisit the issue of moving the meeting date.

Figure 2:
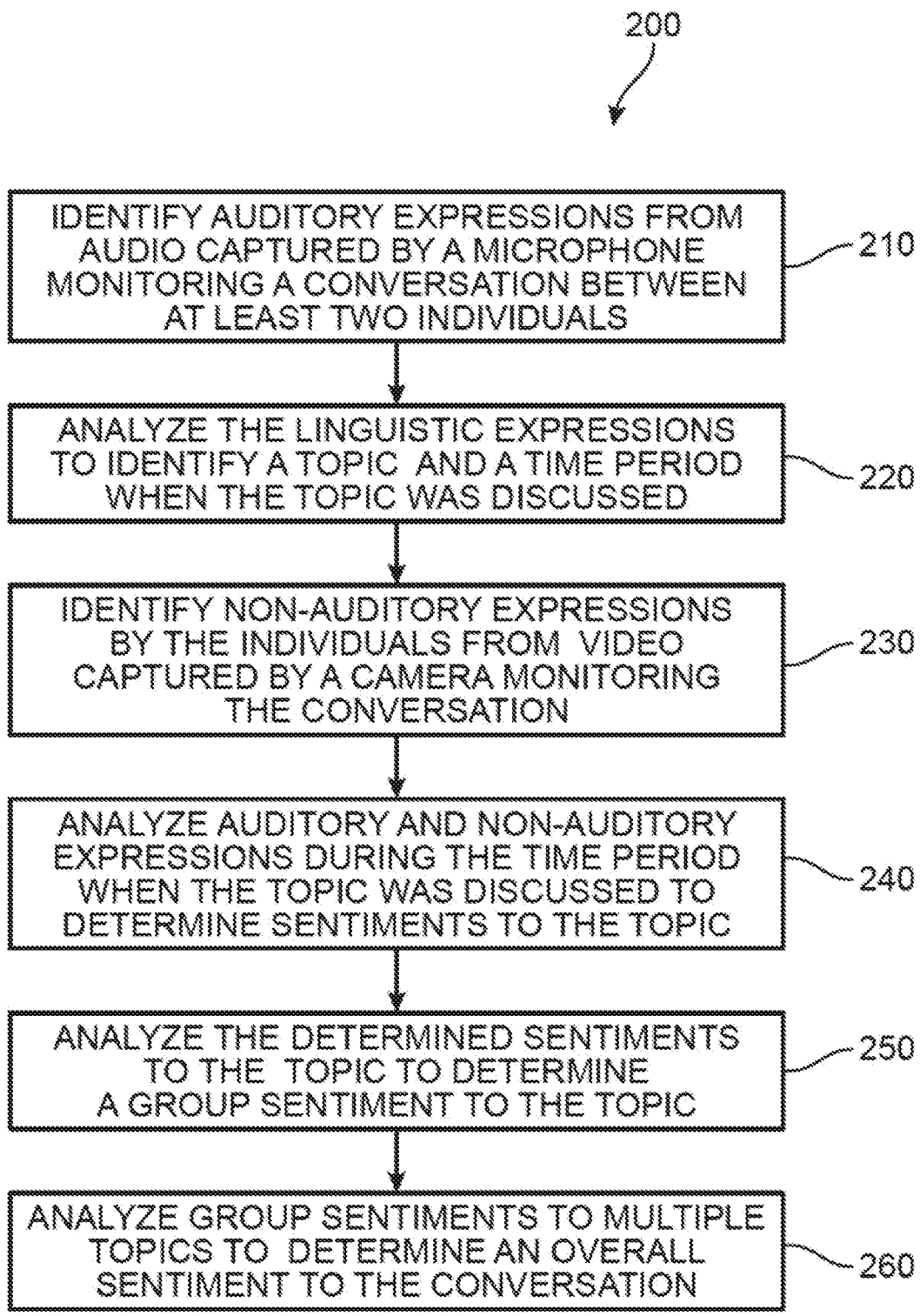
FIG. 2 is a flow diagram illustrating a method for generating a synopsis of a meeting.

FIG. 2 is a flow diagram illustrating a method 200 for generating a synopsis of a meeting. Auditory expressions are identified from audio captured by a microphone monitoring a conversation between two or more individuals (step 210). The auditory expressions can include linguistic expressions (e.g., statements and questions with words) and nonlinguistic expressions (e.g., sighs, groans, chuckles, yawns, laughs, yells, whistles, etc.). The linguistic expressions can be analyzed to identify a topic discussed during the conversation (e.g., quarterly earnings) and a time period when the topic was discussed (step 220). Steps 210 and 220 may be performed for example, by the audio analyzer 110 shown in FIG. 1.

Non-auditory expressions by the individuals and time periods when the non-auditory expressions were identified can be identified from video captured by the camera (step 230). This step may be performed for example, by the video analyzer 120 shown in FIG. 1. Auditory and/or and non-auditory expressions can be analyzed to determine sentiments to the topic (240). This step may be performed for example, by the sentiment analyzer 130 shown in FIG. 1. The determined sentiments to a particular topic can be analyzed to determine a group sentiment to the topic (250). Group sentiments to multiple topics can be analyzed to determine an overall sentiment to the conversation (260). Steps 250 and 260 may be performed for example, by the processor 140 shown in FIG. 1.

As illustrated in FIG. 3, a follow-up task or meeting can be displayed towards the top of the interface. FIG. 3 illustrates an exemplary interface of the device 100 that can be displayed to a user via a screen. The title, date, and time of the meeting can be displayed at the top of the interface (e.g., "Contoso NextGen Camera Product Planning Mar. 13, 2018, 3 PM"). Starting from the right side of the interface, media presented during a meeting can be shown (e.g., slides, images, documents). In this example, no media was presented during the meeting. The column to the left of the "Presented media" column can provide a list of identified topics. In this example, the topics column includes text from a meeting transcript describing the topics discussed (e.g., "Quick summary from the EBC session today"). In another implementation, this column includes a list of topics described with only a few words (e.g., vacation days, telecommuting on Fridays, quarterly profit). In yet another implementation, this column includes a verbatim transcript of all of the words spoken during the meeting.

The column to the left of the topics column can include time stamps indicating when the associated topics were discussed. Although this drawing illustrates 1 second time stamps, the interface can display time periods of longer duration. The column to the left of the topics column can include identified sentiments associated with the topics and the individuals who expressed the sentiments. For example, at 10:05 (10 minutes and 5 seconds from the start of the meeting), the topic "We met with the OECD executive director (Omar's boss) and the person on her team who was introduced to us as a consultant to Omar back in December—that person is now IT director for digital modernization" was identified. The sentiment analyzer 130 identified that a participant to the meeting was "Concerned" when this topic was discussed.

In the next example, at 10:12 (10 minutes and 12 seconds from the start of the meeting), the topic "Executive director said her first goal for modernization is to get people to stop using email and collaborate in modern ways. They are preparing to move to SPO—but Microsoft® is still working on allaying their security concerns . . . " was identified. The sentiment analyzer 130 identified that a participant to the meeting was "Ambivalent" when this topic was discussed. At 10:24 into the meeting, the topic "These people reminded me a bit of Jess and Vanessa at Grey—not as modern, certainly—but they actively (especially the exe director who is in place now about a year) want to modernize and are taking steps to do so. They have no interest in Word Processing features—they are frustrated by how stuck their organization is while being cognizant of their complexities—are eager to figure out how to capitalize on the tech they own to modernize (they own E3 (and *maybe* some E5) and just aren't deploying the cloud yet—but getting closer" was identified. The sentiment analyzer 130 identified that two participants were "Having a side discussion" when this topic was discussed.

In the next example, at 10:37 into the meeting, the topic "Didn't do the journey. They wanted to see the roadmap more pressingly than future concepts—they wanted to walk away with something they could action in the near-term . . . " was identified. The sentiment analyzer 130 identified that a participant was "Annoyed" when this topic was discussed. At 10:43 into the meeting, the topic "We ran out of time because they were behind/we started late—so we didn't finish; didn't get to the Read/Write section and they agree that's super important for them—so I'll schedule a follow-up on Teams™" was identified. The sentiment analyzer 130 identified that a participant was "Concerned" when this topic was discussed.

In the example illustrated in FIG. 3, the processor 140 generates a numeric score for each of the identified sentiments. Because there is only one sentiment identified for each topic, the single identified sentiment is the "group sentiment" to the topic. Thus, there are five group topic numeric scores for the five topics (i.e., −1, −1, 0, −3, and −1). The processor 140 can calculate a sum of all of the group topic numeric scores to generate an overall meeting score. In this example, the overall sentiment to the meeting is negative (e.g., −6).

Figure 4:
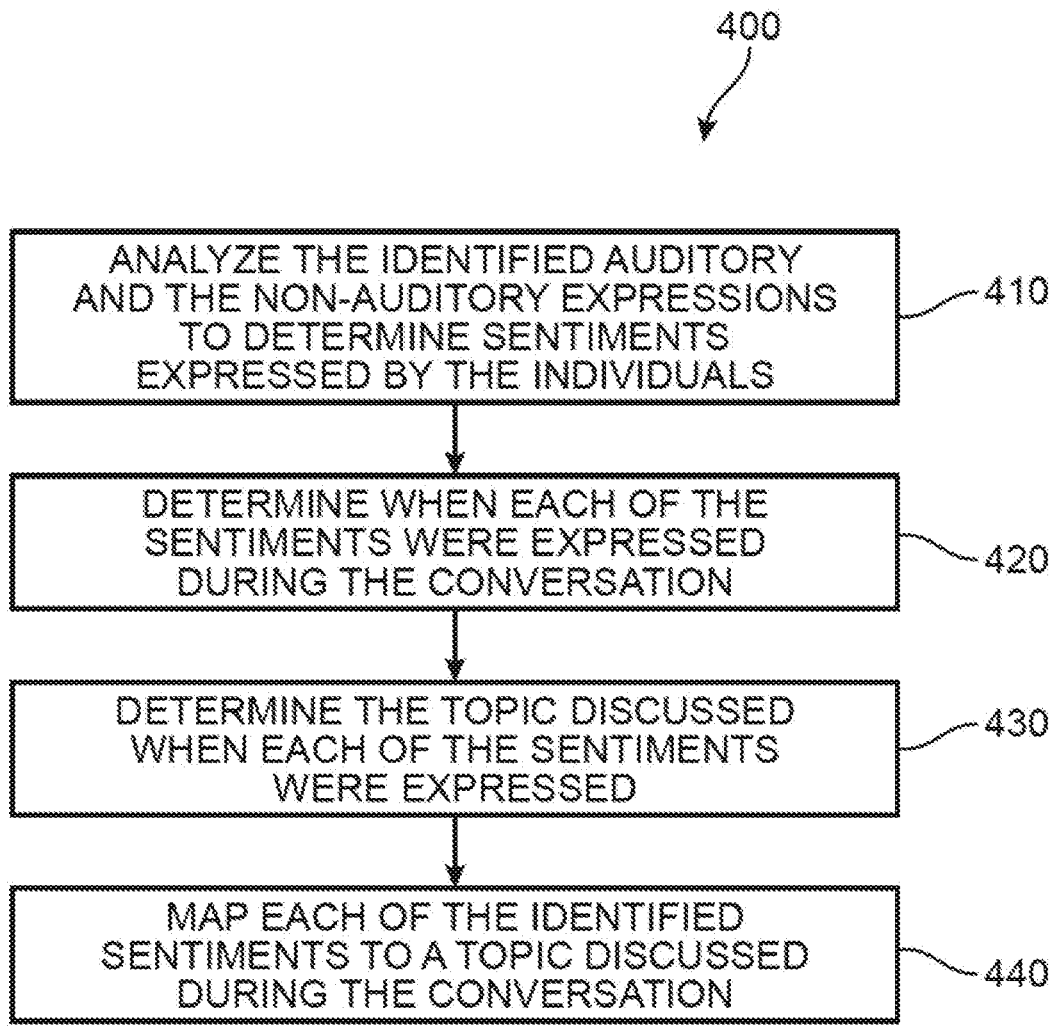
FIG. 4 is a flow diagram illustrating a method of determining sentiments in a group.

FIG. 4 is a flow diagram illustrating a method 400 of determining sentiments in a group. The sentiment analyzer 130 can analyze the identified auditory and non-auditory expressions to determine sentiments expressed by the individuals (410) (e.g., happy, mad, excited). The sentiment analyzer 130 can determine when each of the sentiments were expressed during the conversation (420). For example, the sentiment analyzer 130 can determine that individual X was happy 20 minutes and 14 seconds from the beginning of the meeting because that is when individual X's smile was captured by the camera. In another example, the sentiment analyzer 130 can determine that individual Y was frustrated at 3:36:21 PST because that is when individual Y's sigh was captured by the microphone.

The sentiment analyzer 130 can determine the topic discussed when each of the sentiments were expressed (430). For example, the sentiment analyzer 130 identifies from the meeting transcript that the text "hiring an additional sales associate" was discussed 20 minutes, 14 seconds from the beginning of the meeting. In another example, the sentiment analyzer 130 identifies from the meeting transcript that the text "sorry that we're running over, but this is going to take another 10 minutes" was discussed at 3:36:21 PST. The sentiment analyzer 130 can map each of the identified sentiments to a topic discussed during the conversation (440). For example, the sentiment that was identified at 20 minutes and 14 seconds from the beginning of the meeting is mapped to the topic "hiring an additional sales associate". Moreover, the sentiment that was identified at 3:36:21 PST can be mapped to the topic "sorry that we're running over, but this is going to take another 10 minutes."

Aspects of the present device and methods may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
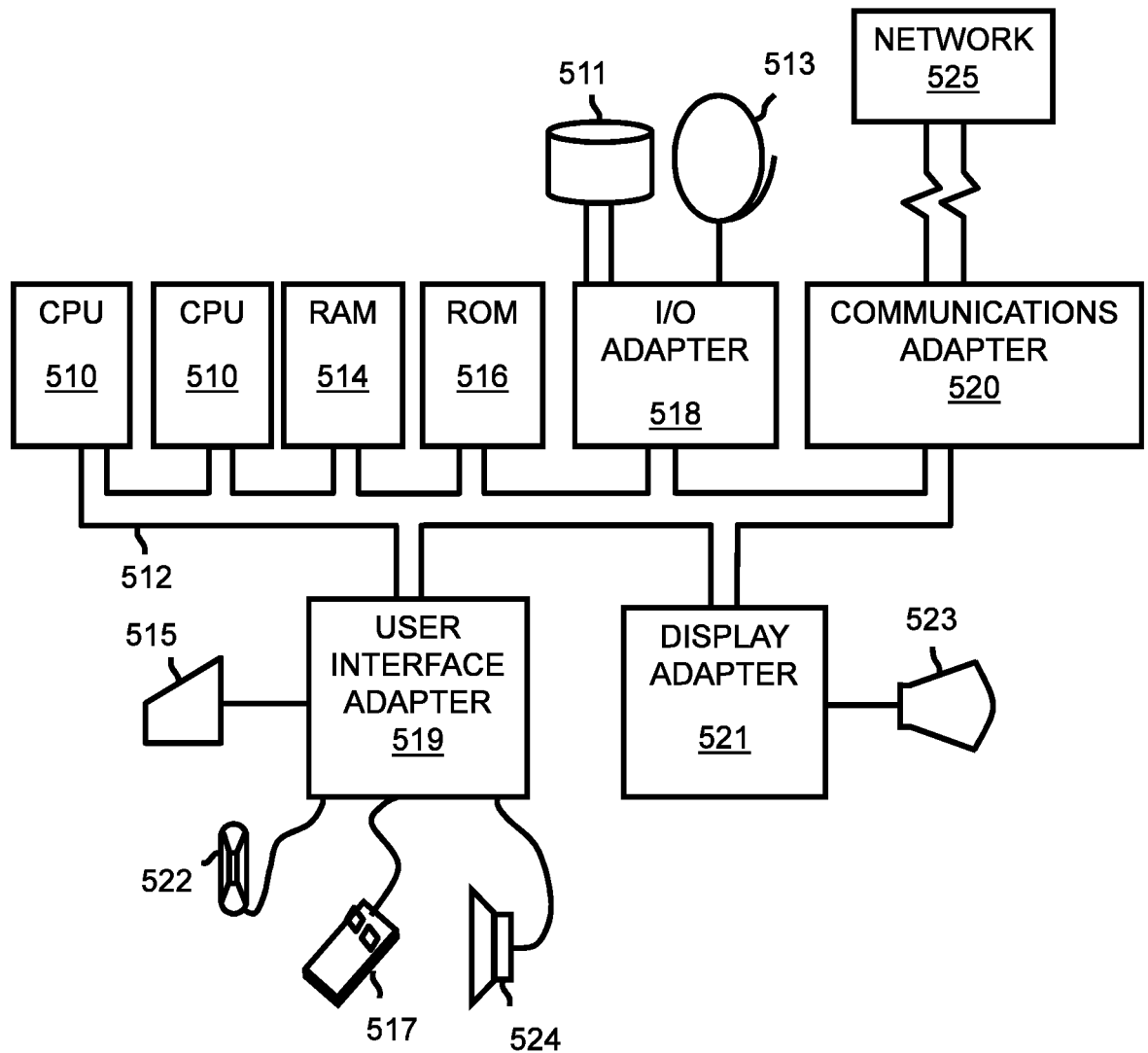
FIG. 5 is a diagram illustrating a computer program product for generating a synopsis of a meeting.

Referring now to FIG. 5, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 510. The CPUs 10 are interconnected with system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of at least one embodiment of the invention. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method for operating a system for determining an overall sentiment to a conversation, comprising:
    identifying auditory expressions from audio captured by at least one microphone monitoring a conversation involving a plurality of individuals, the auditory expressions including linguistic expressions and non-linguistic expressions;
    analyzing the linguistic expressions to identify a topic and a time period when the topic was discussed;
    identifying non-auditory expressions by the plurality of individuals from video captured by at least one camera monitoring the conversation;
    analyzing at least one of auditory expressions during the time period when the topic was discussed and non-auditory expressions during the time period when the topic was discussed to determine sentiments to the topic; and
    analyzing the determined sentiments to the topic to determine a group sentiment to the topic.

2. The method of claim 1, further comprising analyzing group sentiments to multiple topics to determine an overall sentiment to the conversation.

3. The method of claim 1, wherein analyzing the determined sentiments to the topic comprises:
    generating a numeric score for each of the determined sentiments, wherein a numeric score above zero indicates a first sentiment and a numeric score below zero indicates a second sentiment; and
    generating a sum of the numeric scores, wherein a sum above zero indicates a first group sentiment and a sum below zero indicates a second group sentiment.

4. The method of claim 3, wherein a higher numeric score indicates a greater first sentiment and a lower numeric score indicates a greater second sentiment.

5. The method of claim 1, wherein:
    the plurality of individuals includes individuals in a first group and individuals in a second group, and
    analyzing the determined sentiments to the topic comprises:
        generating a numeric score for each determined sentiment that was expressed by the individuals in the first group, wherein a numeric score above zero indicates a first sentiment and a numeric score below zero indicates a second sentiment; and
        generating a sum of the numeric scores, the sum only including numeric scores for sentiments expressed by the individuals in the first group, wherein a sum above zero indicates a first first group sentiment and a sum below zero indicates a second first group sentiment.

6. The method of claim 1, wherein:
    the plurality of individuals includes individuals in a first group and individuals in a second group, and
    analyzing the determined sentiments to the topic comprises:
        generating a first numeric score for each of the determined sentiments expressed by the individuals in the first group, wherein a first numeric score above zero indicates a first sentiment and a first numeric score below zero indicates a second sentiment;
        generating a second numeric score for each of the determined sentiments expressed by the individuals in the second group, wherein a second numeric score above zero indicates a first sentiment and a second numeric score below zero indicates a second sentiment;

multiplying each of the first numeric scores by a first group factor to generate third numeric scores; and generating a sum of the second numeric scores and the third numeric scores, wherein a sum above zero indicates a first group sentiment and a sum below zero indicates a second group sentiment.

7. The method of claim 6, further comprising generating at least one of a follow-up meeting suggestion and a follow-up task list when the second group sentiment is determined.

8. The method of claim 1, wherein analyzing the at least one of auditory expressions during the time period when the topic was discussed and the non-auditory expressions during the time period when the topic was discussed comprises:

analyzing at least one of the auditory expressions and the non-auditory expressions to determine sentiments expressed by the plurality of individuals;

determining when each of the sentiments was expressed during the conversation;

determining a topic discussed when each of the sentiments was expressed; and mapping each of the sentiments to the topic discussed during the conversation.

9. A non-transitory computer-readable medium comprising instructions that, when executed by a processor, cause the processor to control a system for determining a group sentiment to perform:

identifying auditory expressions from audio captured by at least one microphone monitoring a conversation involving a plurality of individuals, the auditory expressions including linguistic expressions and non-linguistic expressions;

analyzing the linguistic expressions to identify a topic and a time period when the topic was discussed;

identifying non-auditory expressions by the plurality of individuals from video captured by at least one camera monitoring the conversation;

analyzing at least one of auditory expressions during the time period when the topic was discussed and non-auditory expressions during the time period when the topic was discussed to determine sentiments to the topic; and analyzing determined sentiments to the topic to determine a group sentiment to the topic.

10. The non-transitory computer-readable medium of claim 9, wherein the instructions, when executed by the processor, further cause the processor to control the system to perform analyzing group sentiments to multiple topics to determine an overall sentiment to the conversation.

11. The non-transitory computer-readable medium of claim 9, wherein, for analyzing the determined sentiments to the topic to determine the group sentiment to the topic, the instructions, when executed by the processor, further cause the processor to control the system to perform:

generating a numeric score for each of the determined sentiments, wherein a numeric score above zero indicates a first sentiment and a numeric score below zero indicates a second sentiment; and generating a sum of the numeric scores, wherein a sum above zero indicates a first group sentiment and a sum below zero indicates a second group sentiment.

12. The non-transitory computer-readable medium of claim 9, wherein:

the plurality of individuals includes individuals in a first group and individuals in a second group, and for analyzing the determined sentiments to the topic to determine the group sentiment to the topic, the instructions, when executed by the processor, further cause the processor to control the system to perform:

generating a numeric score for each determined sentiment that was expressed by the individuals in the first group participating in the conversation, wherein a numeric score above zero indicates a first sentiment and a numeric score below zero indicates a second sentiment; and generating a sum of the numeric scores, the sum only including numeric scores for sentiments expressed by the individuals in the first group, wherein a sum above zero indicates a first first group sentiment and a sum below zero indicates a second second group sentiment.

13. A system for determining an overall sentiment to a conversation, comprising:

a processor; and a computer-readable medium comprising instructions that, when executed by the processor, cause the processor to control the system to perform:

identifying auditory expressions from audio captured by at least one microphone monitoring a conversation involving a plurality of individuals, the auditory expressions including linguistic expressions and nonlinguistic expressions;

analyzing the linguistic expressions to identify a topic and a time period when the topic was discussed;

identifying non-auditory expressions by the plurality of individuals from video captured by at least one camera monitoring the conversation;

analyzing at least one of auditory expressions during the time period when the topic was discussed and non-auditory expressions during the time period when the topic was discussed to determine sentiments to the topic; and analyzing the determined sentiments to the topic to determine a group sentiment to the topic.

14. The system of claim 13, wherein the instructions, when executed by the processor, further cause the processor to control the system to perform analyzing group sentiments to multiple topics to determine an overall sentiment to the conversation.

15. The system of claim 13, wherein, for analyzing of the determined sentiments to the topic, the instructions, when executed by the processor, further cause the processor to control the system to perform:

generating a numeric score for each of the determined sentiments, wherein a numeric score above zero indicates a first sentiment and a numeric score below zero indicates a second sentiment; and generating a sum of the numeric scores, wherein a sum above zero indicates a first group sentiment and a sum below zero indicates a second group sentiment.

16. The system of claim 15, wherein a higher numeric score indicates a greater first sentiment, and a lower numeric score indicates a greater second sentiment.

17. The system of claim 13, wherein:

the plurality of individuals includes individuals in a first group and individuals in a second group, and for analyzing the determined sentiments to the topic, the instructions, when executed by the processor, further cause the processor to control the system to perform:

generating a numeric score for each determined sentiment that was expressed by the individuals in the first group, wherein a numeric score above zero indicates a first sentiment and a numeric score below zero indicates a second sentiment; and generating a sum of the numeric scores, the sum only including numeric scores for sentiments expressed by the individuals in the first group, wherein a sum above zero indicates a first first group sentiment and a sum below zero indicates a second first group sentiment.

18. The system of claim 13, wherein:
the plurality of individuals includes individuals in a first group and individuals in a second group, and
for analyzing the determined sentiments to the topic, the instructions, when executed by the processor, further cause the processor to control the system to perform:
generating a first numeric score for each of the determined sentiments expressed by the individuals in the first group, wherein a first numeric score above zero indicates a first sentiment and a first numeric score below zero indicates a second sentiment;
generating a second numeric score for each of the determined sentiments expressed by the individuals in the second group, wherein a second numeric score above zero indicates a first sentiment and a second numeric score below zero indicates a second sentiment;
multiplying each of the first numeric scores by a first group factor to generate third numeric scores; and
generating a sum of the second numeric scores and the third numeric scores, wherein a sum above zero indicates a first group sentiment and a sum below zero indicates a second group sentiment.

19. The system of claim 18, wherein the instructions, when executed by the processor, further cause the processor to control the system to perform generating at least one of a follow-up meeting suggestion and a follow-up task list when the second group sentiment is determined.

20. The system of claim 13, wherein, for analyzing the at least one of auditory expressions during the time period when the topic was discussed and the non-auditory expressions during the time period when the topic was discussed, the instructions, when executed by the processor, further cause the processor to control the system to perform:
analyzing at least one of the auditory expressions and the non-auditory expressions to determine sentiments expressed by the plurality of individuals;
determining when each of the sentiments was expressed during the conversation;
determining a topic discussed when each of the sentiments was expressed; and
mapping each of the sentiments to the topic discussed during the conversation.

* * * * *